US011964486B2

(12) United States Patent
Iwano

(10) Patent No.: US 11,964,486 B2
(45) Date of Patent: Apr. 23, 2024

(54) LIQUID EJECTION HEAD

(71) Applicant: CANON KABUSHIKI KAISHA, Tokyo (JP)

(72) Inventor: Takuya Iwano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 17/713,890

(22) Filed: Apr. 5, 2022

(65) Prior Publication Data

US 2022/0371322 A1 Nov. 24, 2022

(30) Foreign Application Priority Data

May 21, 2021 (JP) ................................. 2021-086287

(51) Int. Cl.
*B41J 2/14* (2006.01)

(52) U.S. Cl.
CPC .... *B41J 2/1433* (2013.01); *B41J 2002/14491* (2013.01)

(58) Field of Classification Search
CPC ........................................................ B41J 2/1433
See application file for complete search history.

(56) References Cited

U.S. PATENT DOCUMENTS 11,084,286 B2 * 8/2021 Ninagawa .............. B41J 2/1433
2010/0075466 A1 * 3/2010 Chew ......................... B41J 2/16
257/E21.001

FOREIGN PATENT DOCUMENTS

JP 6537242 B2 7/2019
JP 2020-097159 A 6/2020

* cited by examiner

*Primary Examiner* — Jason S Uhlenhake
(74) *Attorney, Agent, or Firm* — Venable LLP

(57) ABSTRACT

A liquid ejection head includes a recording element substrate including an energy generating element configured to generate energy for ejecting liquid from an ejection port; an electrical wiring board electrically connected to the recording element substrate to supply an electric signal for driving the energy generating element; a first support member supporting the recording element substrate; and a second support member supporting the first support member and having a greater linear expansion coefficient than that of the electrical wiring board. The electrical wiring board is bonded to a first surface of the first support member and a second surface of the second support member, and an adhesive that bonds the electrical wiring board to the second surface has a lower elastic modulus than that of an adhesive that bonds the electrical wiring board to the first surface.

10 Claims, 6 Drawing Sheets

LIQUID EJECTION HEAD

BACKGROUND OF THE INVENTION

Field of the Invention

The present invention relates to a liquid ejection head mounted on a liquid ejection recording apparatus.

Description of the Related Art

A typical liquid ejection recording apparatus includes a liquid ejection head, a carriage on which the liquid ejection head is mounted, a means for transporting a recording medium, and a control means for controlling these. A recording system thereof may be a serial scanning system or a page-wide system, for example.

The serial scanning system performs a recording operation while moving the carriage. The page-wide system uses a liquid ejection head sized to correspond to the width of the recording medium and performs a recording operation while moving the recording medium, with the carriage being immobilized.

A page-wide recording apparatus is capable of recording a larger area at a time and thus has a faster recording speed than a serial scanning system. For this reason, a page-wide recording apparatus is used for a liquid ejection recording apparatus for high-speed recording. In a page-wide liquid ejection head, the print chips (ejection modules) constituting the nozzles for ejecting liquid are arranged over the entire width of the recording medium.

Each print chip includes a recording element substrate including ejection ports, which eject liquid, and energy generating elements, which generate energy for ejecting the liquid from the ejection ports. In order to supply an electric signal for driving the energy generating elements to the recording element substrate, the recording element substrate is electrically connected to another substrate by an electrical wiring board.

The electrical wiring board may be bonded and fixed to a support member by adhesion, for example. The temperature of the support member is increased by the heat curing performed to cure a seal that insulates and covers an electric connection portion, for example, or a temperature increase during use, thereby causing the support member to thermally expand. The thermal expansion of the support member applies a tensile stress to the electrical wiring board bonded to the support member. This may cause problems such as the stress applied to the electrical wiring of the electrical wiring board, and the peeling of the bonding portion.

As a means for avoiding a defect in electrical wiring, Japanese Patent No. 6537242 proposes a technique of electrically connecting a support member in a preheated state. The electrical connection established in a heated state leaves slack in the electric connection portion when the support member returns to ordinary temperature and contracts. Even when the temperature of the support member rises again, no tensile stress is applied to the electric connection portion due to the created slack.

However, with a page-wide type liquid ejection head, in which a plurality of chips are arranged with high accuracy, the heating process may degrade the accuracy of arrangement. For example, when the ejection modules are arranged on a support member having a greater linear expansion coefficient such as a resin member, the influence of heating on the accuracy of the arrangement becomes more significant.

As a means for improving the reliability of the electrical wiring board against temperature changes, Japanese Patent Application Publication No. 2020-97159 proposes a technique of creating slack in an electrical wiring board using a fixing tool on the apparatus side, when bonding the electrical wiring board.

However, the amount of slack in the electrical wiring board may vary due to the displacement of the fixing tool or the variation in the component dimensions. Also, when the electrical wiring board is pressed by the fixing tool to be bonded and fixed, the arrangement accuracy of the print chips may be lowered.

SUMMARY OF THE INVENTION

The present invention provides a technique that improves the reliability of an electrical wiring board bonded to a support member against temperature changes.

A first aspect of the present invention is a liquid ejection head including: a recording element substrate including an energy generating element configured to generate energy for ejecting liquid from an ejection port; an electrical wiring board electrically connected to the recording element substrate to supply an electric signal for driving the energy generating element; a first support member supporting the recording element substrate; and a second support member supporting the first support member and having a greater linear expansion coefficient than the electrical wiring board, wherein the electrical wiring board is bonded to a first surface of the first support member and a second surface of the second support member, and an adhesive that bonds the electrical wiring board to the second surface has a lower elastic modulus than an adhesive that bonds the electrical wiring board to the first surface.

A second aspect of the present invention is a liquid ejection head including: a recording element substrate including an energy generating element configured to generate energy for ejecting liquid from an ejection port; an electrical wiring board electrically connected to the recording element substrate to supply an electric signal for driving the energy generating element; a first support member supporting the recording element substrate; and a second support member supporting the first support member and having a greater linear expansion coefficient than the electrical wiring board, wherein the electrical wiring board is bonded to a first surface of the first support member and a third surface of the second support member substantially orthogonal to the first surface, and the second support member has a second surface that is an inclined surface between an edge of the first surface and an edge of the third surface that is substantially orthogonal to the first surface.

Further features of the present invention will become apparent from the following description of exemplary embodiments with reference to the attached drawings.

DESCRIPTION OF THE EMBODIMENTS

First Embodiment

Figure 1A:
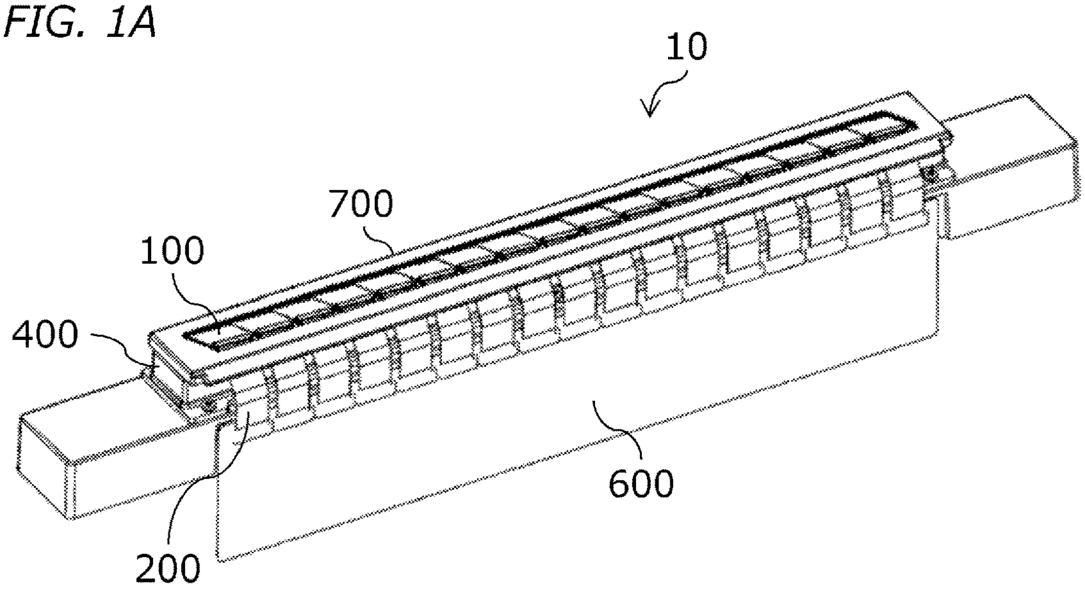
FIGS. 1A to 1D are perspective, exploded, and cross-sectional views of a liquid ejection head.

Referring to the drawings, embodiments of the present invention are now described. FIGS. 1A to 1D are perspective, exploded, and cross-sectional views of a liquid ejection head. A liquid ejection head 10 according to an embodiment is a page-wide liquid ejection head, in which recording element substrates 100 for ejecting liquid are arranged in the longitudinal direction. The liquid ejection head according to the present embodiment is applicable to an apparatus such as a printer, a copier, and a facsimile machine as an image forming apparatus. Furthermore, the liquid ejection head may be mounted on an apparatus, such as a printer, as a cartridge formed integrally with a tank that supplies liquid to the liquid ejection head.

Figure 1B:
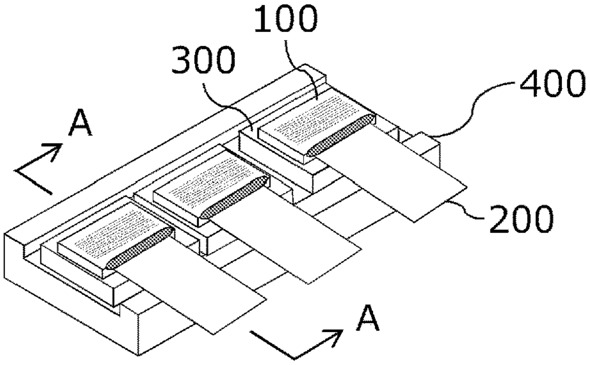
Figure 1C:
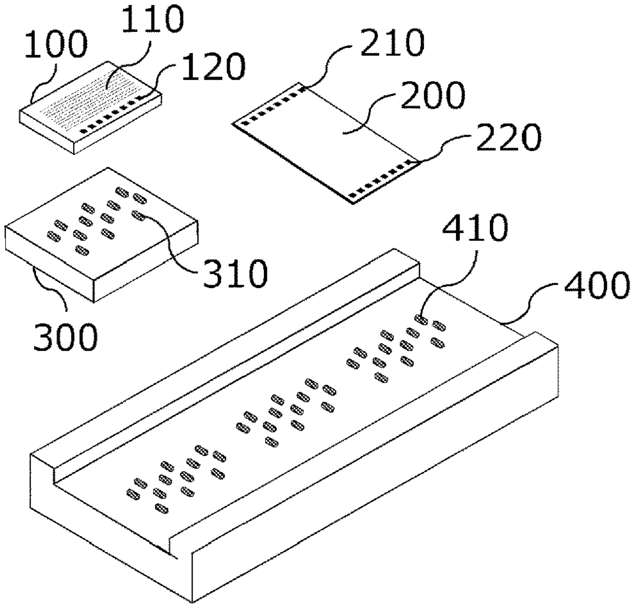
Figure 1D:
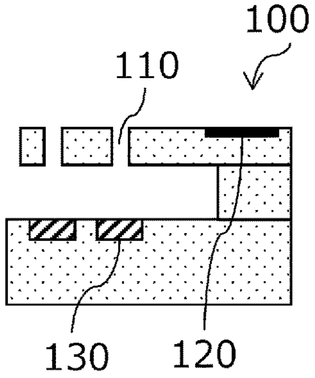
Figure 2:
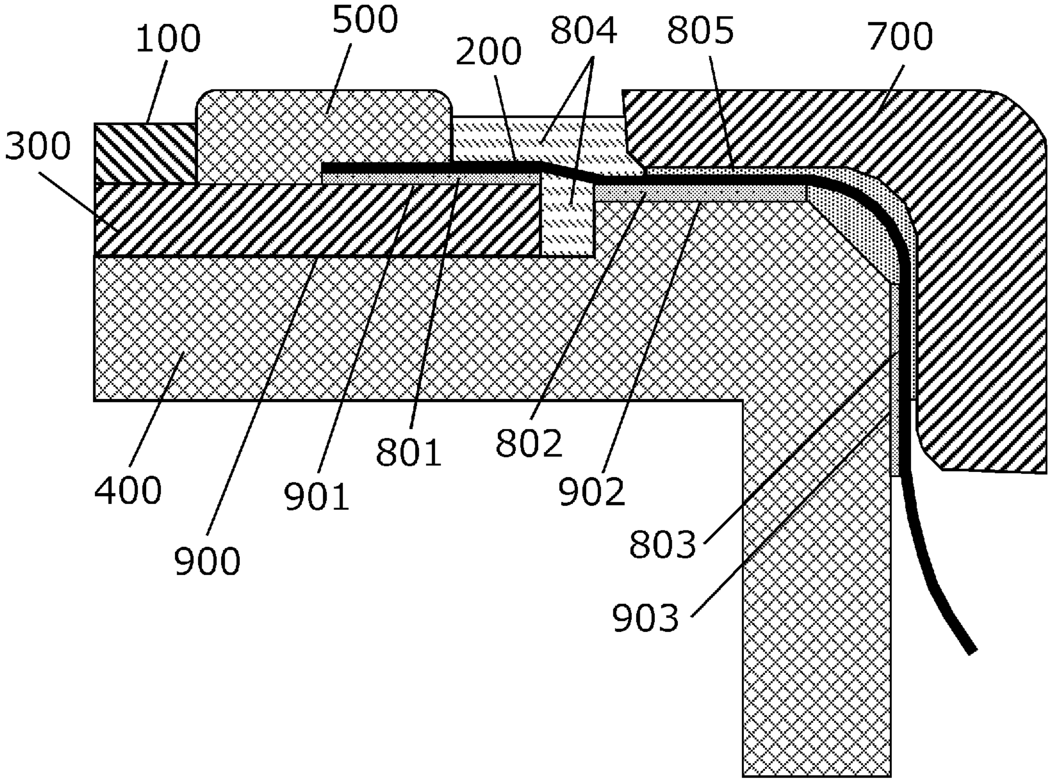
FIG. 2 is a cross-sectional view of a liquid ejection head according to a first embodiment.

FIG. 1A is a perspective view of the liquid ejection head 10 to which the present embodiment is applied. FIG. 1B is a perspective view of a part of the liquid ejection head 10. FIG. 1B shows a state before electrical wiring boards 200 are bent. FIG. 1C is a perspective view of disassembled parts of the liquid ejection head 10. FIG. 1D is a cross-sectional view of a recording element substrate 100. FIG. 2 is a cross-sectional view of the liquid ejection head 10 according to the first embodiment. FIG. 2 shows a cross-sectional view of a part of a cross-section taken along line A-A in the perspective view of FIG. 1B including an electrical wiring board 200. FIG. 2 shows a state after the electrical wiring board 200 is bent.

The liquid ejection head 10 includes recording element substrates 100, first support members 300, a second support member 400, and electrical wiring boards 200. Each recording element substrate 100 includes ejection ports 110, an electrode 120, and energy generating elements 130.

The ejection ports 110 are openings for ejecting ink as liquid for recording an image on a recording medium. A plurality of ejection ports 110 is arranged in a recording element substrate 100. The electrode 120 is connected to a first connection terminal 210 of an electrical wiring board 200, and receives an electric signal from the electrical wiring board 200. The electrode 120 may be connected to the first connection terminal 210 by wire bonding, for example.

The energy generating elements 130 are elements that are driven by the electric power supplied from the connection terminal 210 and generate energy for ejecting ink from the ejection ports 110. The energy generating elements 130 face the corresponding ejection ports 110. The energy generating elements 130 may be heat generating resistance elements that generate heat energy, or piezoelectric elements, for example.

The recording element substrate 100 includes flow passages (not shown) of the ink ejected from the ejection ports 110. The recording element substrate 100 has openings (not shown) in its back side through which the ink supplied from the first support member 300 flows. The ink flow passages of the recording element substrate 100 are formed by connecting the openings in the back side to the ejection ports 110.

The first support member 300 includes a first surface 901 that supports the recording element substrate 100 and the electrical wiring board 200. One end of the electrical wiring board 200 is bonded to the first surface 901 with an adhesive 801.

In the electrical wiring board 200, the section including the first connection terminal 210 is bonded to the first surface 901. As such, to ensure the reliable electric connection with the recording element substrate 100, the electrical wiring board 200 is preferably firmly fixed to the first surface 901 of the first support member 300 to avoid displacement.

The first support member 300 includes flow passages (not shown) for supplying ink to the recording element substrate 100. The first surface 901 has openings 310 through which the ink flows. The first support member 300 also has openings (not shown) in the surface (back side) opposite to the surface including the openings 310. The flow passages for supplying ink to the recording element substrate 100 are formed by connecting the openings 310 to the openings formed in the opposite surface. To support the recording element substrate 100, the first support member 300 preferably has a predetermined flatness and is made of a reliable material, such as alumina or other ceramic.

The second support member 400 has a support surface 900, which supports the first support members 300, and openings 410, through which ink is supplied from a liquid supply portion (not shown), such as an ink tank, to the first support members 300. The openings 410 communicate with the openings provided at the back sides of the openings 310. The second support member 400 is preferably formed of a resin member containing a filler, for example.

The second support member 400 also has second surfaces 902 extending in the longitudinal direction on opposite sides of the support surface 900. The second surfaces 902 are located at positions higher than the support surface 900. The second support member 400 also has a third surface 903 that is substantially orthogonal to the first surface 901 of the first support member 300. A second surface 902 is located between an edge of the first surface 901 of each first support member 300 and an edge of the third surface 903, which is substantially orthogonal to the first surface 901.

It should be noted that a situation where the third surface 903 is substantially orthogonal to the first surface 901 is not limited to a situation where the third surface 903 is orthogonal to the first surface 901. The third surface 903 may be a surface extending in a direction having an angle larger than 90 degrees or an angle smaller than 90 degrees with respect to the first surface 901.

As shown in FIGS. 1A and 1B, the second support member 400 supports a plurality of print chip units, each including a recording element substrate 100, an electrical wiring board 200, and a first support member 300, arranged in the longitudinal direction. That is, the second support member 400 is a support member that is elongated in a width direction orthogonal to the transport direction of the recording medium. A plurality of print chip units is arranged in the width direction on the single second support member 400. As such, the influence of thermal expansion described above is more significant in the second support member 400 than in the first support member 300 due to the difference in size (volume) between the members. Accordingly, in the unit adhesion portion, the conformability with respect to the second support member 400 is important. However, the configuration of the liquid ejection head 10 to which the present invention is applicable is not limited to the configuration exemplified here, and the target member that needs to have conformability in the adhesion portion is determined in relation to the apparatus configuration.

The electrical wiring board 200 supplies an electric signal for driving the energy generating elements to the recording element substrate 100. The electrical wiring board 200 is bonded to the first support member 300 and the second support member 400 so as to be suspended between the first surface 901 and the second surface 902.

An adhesive 802 that bonds the electrical wiring board 200 to the second surface 902 has a lower elastic modulus than the adhesive 801 that bonds the electrical wiring board 200 to the first surface 901. The elastic modulus is a physical property value representing the resistance to deformation, and is expressed by a relation between stress and strain in elastic deformation (elastic modulus=stress/strain). The elastic modulus can be measured under the conditions of 25° C. and 10 KHz using a viscoelasticity measuring device (DMS).

When the elastic modulus of the adhesive 802 is lower than the elastic modulus of the adhesive 801, the adhesive 802 is easier to deform than the adhesive 801. In this case, the elastic modulus of the adhesive 801 is higher than the elastic modulus of the adhesive 802, and the adhesive 801 resists deformation as compared to the adhesive 802.

The elastic modulus of the adhesive 801 is higher than the elastic modulus of the adhesive 802 in order for the section of the electrical wiring board 200 that includes the first connection terminal 210 to be firmly fixed to the first surface 901 of the first support member 300 so that this section resists displacement and deformation, for example. When the first connection terminal 210 of the electrical wiring board 200 is firmly fixed to the first surface 901, the electrical wiring board 200 ensures the reliable electrical connection with the recording element substrate 100.

The space in which the electrical wiring board 200 is suspended between the first surface 901 and the second surface 902 may be filled with an adhesive 804. The adhesive 804 preferably has a lower elastic modulus than the adhesive 802 that bonds the electrical wiring board 200 to the second surface 902. Nevertheless, as long as the elastic modulus of the adhesive 804 is lower than the elastic modulus of the adhesive 801 that bonds the electrical wiring board 200 to the first surface 901, there is no limitation to the magnitude relationship with the elastic moduli of other adhesives.

The electrical wiring board 200 is a flexible wiring board in which conductive copper foil printed wiring is bonded to and sandwiched between two thin, soft polyimide films having insulating properties. The electrical wiring board 200 has a thickness of about 0.1 to 0.3 mm.

One of the polyimide films sandwiching the copper foil printed wiring is smaller than the other polyimide film, so that opposite ends of the copper foil printed wiring are exposed. The first connection terminal 210 and the second connection terminal 220 are formed in exposed portions at opposite ends of the copper foil printed wiring.

The first connection terminal 210 is electrically connected to the electrode 120 of the recording element substrate 100 by wire bonding. The second connection terminal 220 is used as a connection terminal to be connected to the outside, and is electrically connected to an electric board 600, which generates electric signals.

A sealing member 500 insulates and covers the electrode 120 of the recording element substrate 100, the first connection terminal 210 of the electrical wiring board 200, and the wire connecting the electrode 120 to the first connection terminal 210 to prevent electrical defects due to liquid ingress or the like.

A cover member 700 is arranged around the recording element substrates 100 to form a surface with which a suction recovery cap for removing bubbles in the flow passages comes into contact. The cover member 700 covers the electrical wiring boards 200 and the second and third surfaces 902 and 903 of the second support member 400. The space between the cover member 700 and the second support member 400 may be filled with an adhesive 805. As long as the elastic modulus of the adhesive 805 is lower than the elastic modulus of the adhesive 801 that bonds the electrical wiring board 200 to the first surface 901, there is no limitation to the magnitude relationship with the elastic moduli of other adhesives.

Each electrical wiring board 200 is electrically connected to the corresponding recording element substrate 100. One end of the electrical wiring board 200 is bonded to the first surface 901 of the support member 300. The electrical wiring board 200 is preferably bonded to the third surface 903 of the second support member 400, in addition to the second surface 902, to prevent interference with the cover member 700 when the cover member 700 is bonded to the second support member 400.

The third surface 903 of the second support member 400 extends substantially orthogonal to the first surface 901. The adhesive 803 bonding the electrical wiring board 200 to the third surface 903 preferably has a lower elastic modulus (is easier to deform) than the adhesive 801 that bonds the electrical wiring board 200 to the first surface 901. Also, the adhesive 803 preferably has a higher elastic modulus than (resists deformation as compared to) the adhesive 802 that bonds the electrical wiring board 200 to the second surface 902.

That is, it is preferable that the adhesive 801 be the highest in elastic modulus followed by the adhesive 803 and then the adhesive 802. The section of the electrical wiring board 200 that includes the first connection terminal 210 is firmly fixed to the first surface 901, and the electrical wiring board 200 is bonded to the second surface 902 with the adhesive 802, which has a lower elastic modulus than the adhesive 801, to absorb the tensile stress caused by thermal expansion.

Furthermore, the electrical wiring board 200 is bonded to the third surface 903, which is farther from the first surface 901 than the second surface 902, with the adhesive 803 having a higher elastic modulus than the adhesive 802 on the second surface 902. The adhesive 803, which has a higher elastic modulus than the adhesive at a position near the first surface 901, is used at a position farther from the first surface 901. This allows the electrical wiring board 200 to be firmly fixed to the support members.

The above-mentioned configuration enables the liquid ejection head 10 of the first embodiment to reduce the tensile stress applied to the electrical wiring boards 200 even when the second support member 400 thermally expands due to a temperature change, thereby reducing the likelihood of wiring defects. The tensile stress is a force generated within the electrical wiring boards 200 when the tensile force from the support member 400 acts on the electrical wiring boards 200.

Figure 3A:
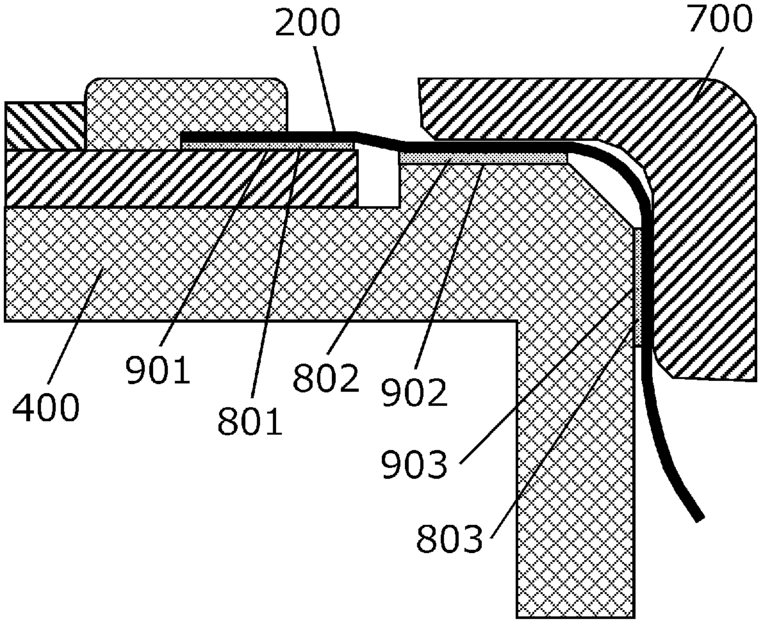
FIGS. 3A and 3B are diagrams illustrating the thermal expansion of a support member.
Figure 3B:
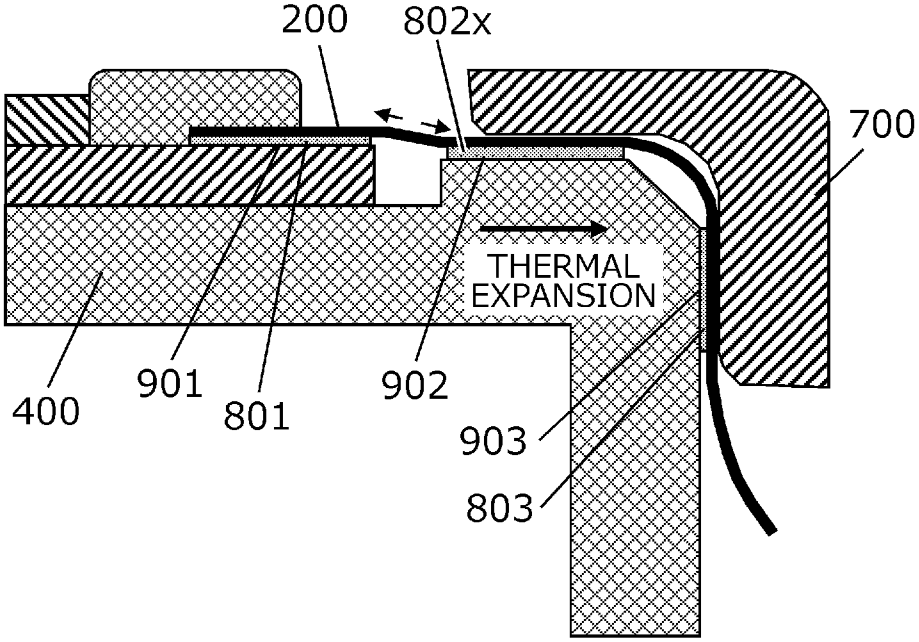

Referring to FIGS. 3A and 3B, a mechanism is now described that reduces the tensile stress on the electrical wiring boards 200 when the second support member 400 thermally expands. FIG. 3A is a cross-sectional view of an area around an electrical wiring board 200 at ordinary temperature. The electrical wiring board 200 is bonded to the first surface 901 of the first support member 300 and the second surface 902 of the second support member 400 with the adhesive 801 and the adhesive 802, respectively. The electrical wiring board 200 may be bonded to the third surface 903 with the adhesive 803.

First, referring to FIG. 3B, the thermal expansion of a liquid ejection head according to a comparison example is described. FIG. 3B is a cross-sectional view of an area around an electrical wiring board 200 in which the second support member 400 is thermally expanded toward the cover member 700. FIG. 3B shows an example in which an adhesive 802*x* having a higher elastic modulus than the adhesive 801 that bonds the electrical wiring board 200 to the first surface 901 is used as the adhesive for bonding the electrical wiring board 200 to the second surface 902. As in the configuration shown in FIG. 3A, the electrical wiring board 200 may be bonded to the third surface 903 with the adhesive 803.

When the adhesive 802*x* on the second surface 902 has a higher elastic modulus than the adhesive 801 on the first surface 901, the electrical wiring board 200 is firmly held by the first and second surfaces 901 and 902. When the support member 400 thermally expands due to a temperature change, the distance between an edge of the first surface 901 and an edge of the second surface 902 increases. Since the adhesive 802*x* on the second surface 902 does not deform, as indicated by the arrows in FIG. 3B, forces are created in the electrical wiring board 200 in directions that pull the section bonded to the first surface 901 and the section bonded to the second surface 902 toward each other.

For example, when the second support member 400 has a greater linear expansion coefficient than the electrical wiring board 200, a change in the environmental temperature causes the second support member 400 to expand to an extent equal to or greater than the expansion amount of the electrical wiring board 200. When the second support member 400 thermally expands, a tensile stress is generated in the electrical wiring board 200 corresponding to the tensile forces indicated by the arrows in FIG. 3B. The tensile stress may cause wiring defects in the electrical wiring board 200.

Figure 4:
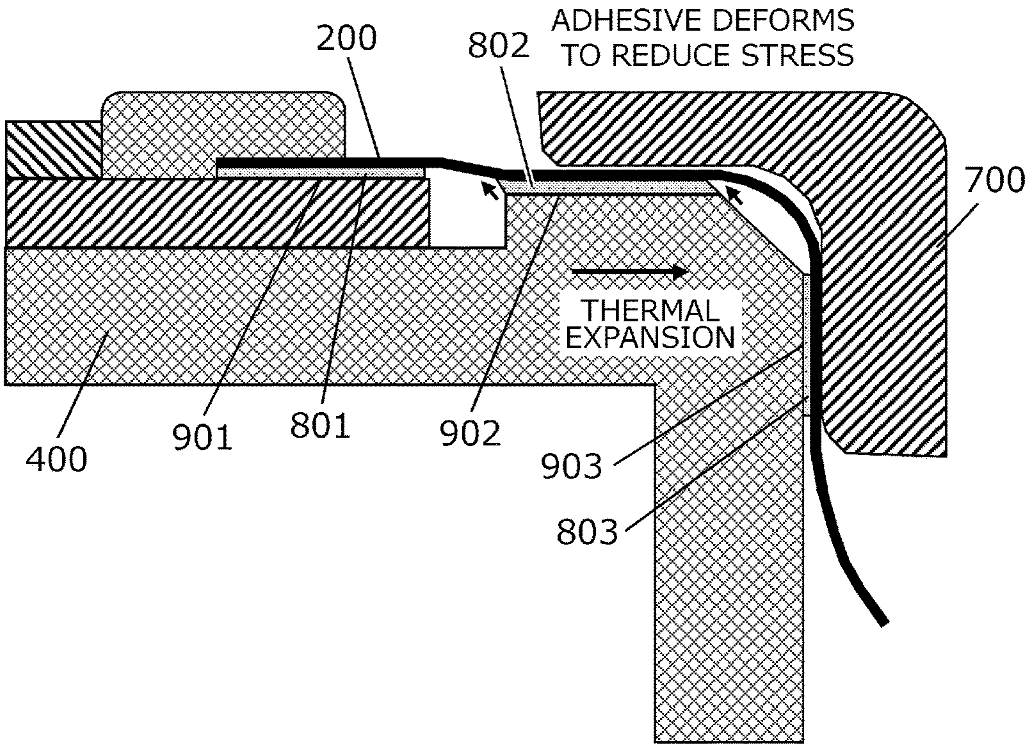
FIG. 4 is a cross-sectional view showing the liquid ejection head according to the first embodiment during thermal expansion.

Referring to FIG. 4, the thermal expansion of the liquid ejection head according to the first embodiment is now described. FIG. 4 shows an example in which an adhesive 802 having a lower elastic modulus than the adhesive 801 that bonds the electrical wiring board 200 to the first surface 901 is used as the adhesive for bonding the electrical wiring board 200 to the second surface 902. Even when the second support member 400 thermally expands to an extent equal to or greater than the thermal expansion amount of the electrical wiring board 200, the adhesive 802 having a low elastic modulus (relatively easy to deform) on the second surface 902 deforms to conform to the second support member 400, reducing the tensile stress on the electrical wiring board 200.

Additionally, the first support member 300 has a smaller linear expansion coefficient than the second support member 400, and the difference in linear expansion coefficient between the first support member 300 and the electrical wiring board 200 is less than the difference in linear expansion coefficient between the second support member 400 and the electrical wiring board 200. Thus, the conformability with respect to the second support member 400 needs to be higher than the conformability with respect to the first support member 300 also for the above reason. Accordingly, as the adhesive for bonding the electrical wiring board 200 to the second surface 902, the adhesive 802 that has a lower elastic modulus than the adhesive 801 that bonds the electrical wiring board 200 to the first surface 901 is preferably used.

The third surface 903 may be bonded to the electrical wiring board 200 with the adhesive 803. The elastic modulus of the adhesive 803 is not limited to a particular value, but is preferably lower than the elastic modulus of the adhesive 801. Also, when the second support member 400 thermally expands, the tensile stress applied to the section of the electrical wiring board 200 corresponding to the third surface is less than the tensile stress applied to the section of the electrical wiring board 200 corresponding to the second surface. For this reason, to fix the electrical wiring board 200 to the second support member 400, the adhesive 803 preferably has a higher elastic modulus than the adhesive 802. In terms of cost, it is preferable to use the same type of adhesive rather than using various types of adhesives. For example, it is preferable to use, as the adhesive 803 and the adhesive 805, the same type of adhesive as the adhesive 802, that is, an adhesive having an equivalent elastic modulus.

Second Embodiment

Figure 5:
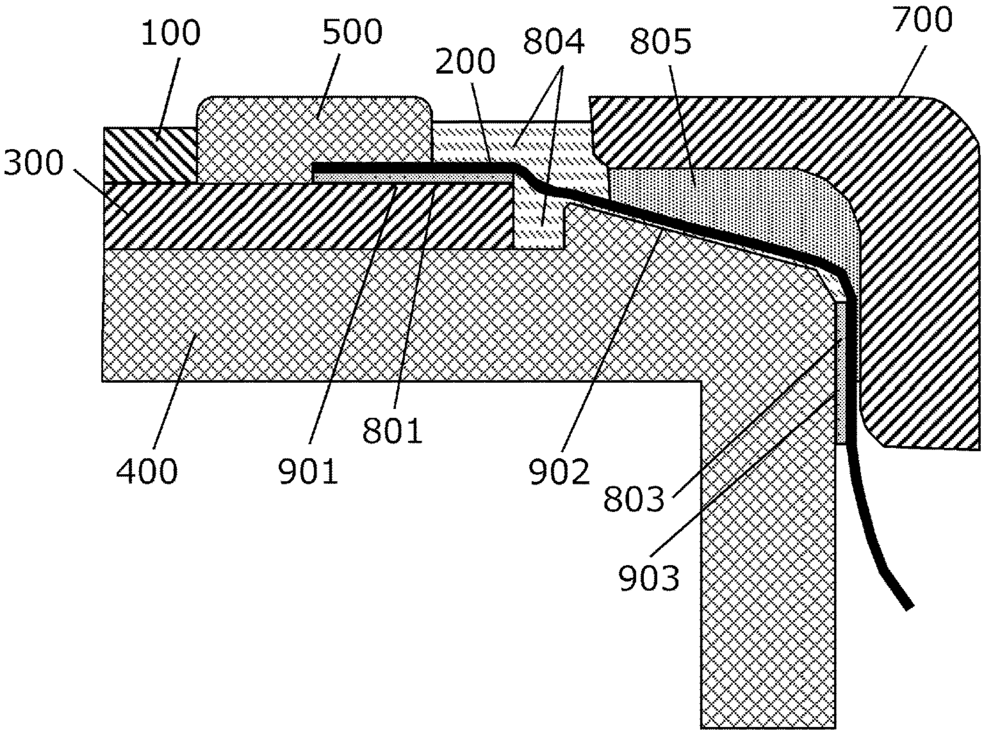
FIG. 5 is a cross-sectional view of a liquid ejection head according to a second embodiment.

The following description mainly focuses on the configurations of a second embodiment that differ from those of the first embodiment. The configurations of common parts are not described. FIG. 5 is a cross-sectional view of a liquid ejection head 10 according to the second embodiment. FIG. 5 shows a cross-sectional view of a part of a cross-section taken along line A-A in the perspective view of FIG. 1B including an electrical wiring board 200.

The electrical wiring board 200 is electrically connected to the recording element substrate 100 and has an end bonded to the first surface 901 of the first support member 300 with an adhesive 801. The electrical wiring board 200 is also bonded to the third surface 903 of the second support member 400 with an adhesive 803. The third surface 903 is substantially orthogonal to the first surface 901.

Figure 6A:
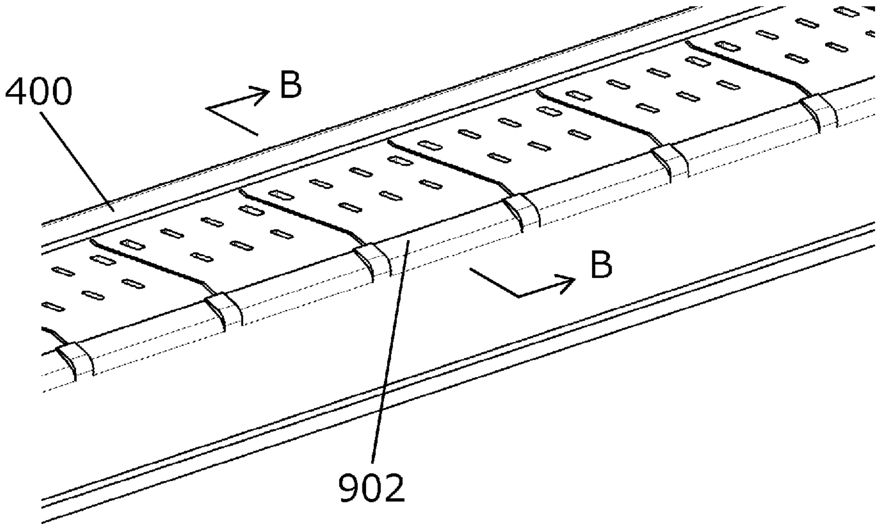
FIGS. 6A and 6B are views illustrating a second support member of the liquid ejection head according to the second embodiment.
Figure 6B:
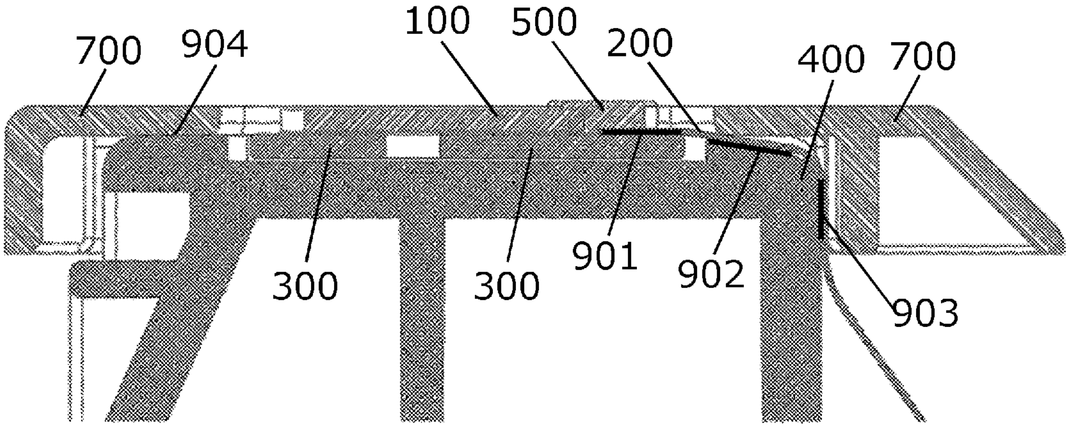

FIGS. 6A and 6B are views illustrating the second support member 400 according to the second embodiment. FIG. 6A is an enlarged perspective view of the second support member 400 of the liquid ejection head 10 according to the second embodiment. FIG. 6B is a cross-sectional view taken along line B-B in FIG. 6A in a state in which the first support member 300, the electrical wiring board 200, and the cover member 700 are bonded to the second support member 400.

As shown in FIGS. 6A and 6B, the second surface 902 of the second support member 400 is an inclined surface forming an angle of 0 degrees or more and less than 90 degrees with the first surface 901 of the first support member 300. Also, the second surface 902, which is an inclined surface, is lower than a bonding surface 904 between the cover member 700 and the second support member 400, that is, the inner surface of the cover member 700, in a height direction perpendicular to the first surface 901.

In the example of FIG. 6B, the bonding surface 904 is formed so as to be at the same height as the first surface 901 of the first support member 300. Accordingly, the second surface 902 is located at a position lower than the first surface 901 in the height direction perpendicular to the first surface 901. The height direction is typically substantially the same as the ink ejection direction (the opening direction of the ejection ports 110) of the liquid ejection head, but may vary depending on the apparatus configuration.

This configuration forms a gap between the second surface 902 and the inner surface of the cover member 700. The gap between the second surface 902 and the inner surface of the cover member 700 allows the electrical wiring board 200 to be bonded to the third surface 903 with slack in the section of the electrical wiring board 200 that is in contact with (faces) the second surface 902. The liquid ejection head 10 is not limited to the configuration shown in FIGS. 6A and 6B, and may have any configuration as long as a gap is formed between the second surface 902 and the inner surface of the cover member 700 and there is slack in the electrical wiring board 200.

Additionally, the second surface 902 is formed such that the amount of level difference between the second surface 902 and the bonding surface 904 (the distance between the second surface 902 and the inner surface of the cover member 700) is at least greater than the thickness of the electrical wiring board 200. This configuration allows for slack in the section of the electrical wiring board 200 that is in contact with the second surface 902, thereby reducing the tensile stress applied to the electrical wiring board 200 even when the second support member 400 thermally expands.

In the example of FIG. 6B, the bonding surface 904 of the second support member 400 is formed so as to be at substantially the same height as the upper surface of the first support member 300. That is, the second surface 902 is formed so as to be lower in height than the upper surface of the first support member 300.

As shown in FIG. 5, the electrical wiring board 200 is shaped to incline along the inclined surface (the second surface 902) of the second support member 400. The second surface 902 is lower than the first surface 901, allowing the electrical wiring board 200 to be bonded to the third surface 903 with slack.

Figure 7:
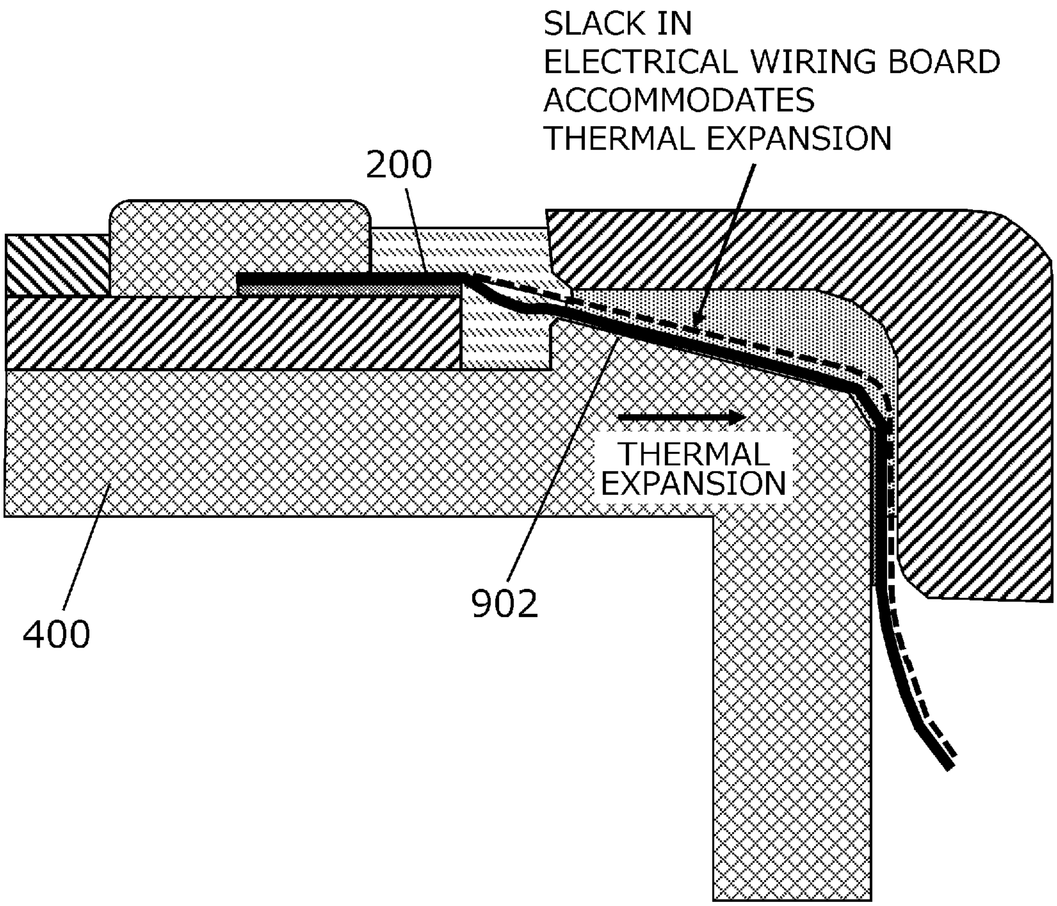
FIG. 7 is a cross-sectional view showing the liquid ejection head according to the second embodiment during thermal expansion.

As shown in FIG. 7, even when the second support member 400 thermally expands due to a temperature change, the slack in the electrical wiring board 200 allows the electrical wiring board 200 to accommodate the extension of the second support member 400 caused by the thermal expansion.

As a result, the electrical wiring board 200 is free from tensile stress when the temperature changes, limiting the likelihood of wiring defects. The electrical wiring board 200 is not bonded (fixed) to the second surface 902. However, the space between the electrical wiring board 200 and the second surface 902 may be filled with an adhesive 804 that has a lower elastic modulus (is easier to deform) than the adhesive 801 that bonds the electrical wiring board 200 to the first surface 901. Also, the adhesive 804 preferably has a lower elastic modulus (is easier to deform) than the adhesive 803 that bonds the electrical wiring board 200 to the third surface 903.

The above configuration does not apply a tensile stress to the electrical wiring board 200 even when the second support member thermally expands due to a temperature change, thereby limiting wiring breakage in the liquid ejection head 10.

The present disclosure is not limited to the embodiments described above, which are preferable in regard to the elastic moduli of adhesives. As long as the elastic modulus of the adhesive 801 that bonds the electrical wiring board 200 to the first surface 901 is higher than the elastic moduli of the other adhesives 802 to 805, there is no limitation to the magnitude relationship between the elastic moduli of the other adhesives.

The present disclosure provides a technique that improves the reliability of an electrical wiring board bonded to a support member against temperature changes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-086287, filed on May 21, 2021, which is hereby incorporated by reference herein in its entirety.

What is claimed is:

1. A liquid ejection head comprising:

a recording element substrate including an energy generating element configured to generate energy for ejecting liquid from an ejection port;

an electrical wiring board electrically connected to the recording element substrate to supply an electric signal for driving the energy generating element;

a first support member supporting the recording element substrate; and a second support member supporting the first support member and having a greater linear expansion coefficient than that of the electrical wiring board, wherein the electrical wiring board is bonded to a first surface of the first support member and a second surface of the second support member, an adhesive that bonds the electrical wiring board to the second surface has a lower elastic modulus than that of an adhesive that bonds the electrical wiring board to the first surface, and a difference in linear expansion coefficient between the first support member and the electrical wiring board is less than a difference in linear expansion coefficient between the second support member and the electrical wiring board.

2. The liquid ejection head according to claim 1, wherein the electrical wiring board is bonded to a third surface substantially orthogonal to the first surface, and an adhesive that bonds the electrical wiring board to the third surface has a lower elastic modulus than that of the adhesive that bonds the electrical wiring board to the first surface.

3. The liquid ejection head according to claim 2, wherein the electrical wiring board is bonded to the third surface that is located at a position farther from the first surface than the second surface with an adhesive that has a higher elastic modulus than that of the adhesive that bonds the electrical wiring board to the second surface.

4. The liquid ejection head according to claim 1, wherein the first surface is a surface to which a section of the electrical wiring board that includes a connection terminal for supplying electric power to the recording element substrate is bonded.

5. The liquid ejection head according to claim 1, wherein the second support member supports a plurality of units arranged in a longitudinal direction, the units each including the recording element substrate, the electrical wiring board, and the first support member.

6. A liquid ejection head comprising:

a recording element substrate including an energy generating element configured to generate energy for ejecting liquid from an ejection port;

an electrical wiring board electrically connected to the recording element substrate to supply an electric signal for driving the energy generating element;

a first support member supporting the recording element substrate; and a second support member supporting the first support member and having a greater linear expansion coefficient than that of the electrical wiring board, wherein the electrical wiring board is bonded to a first surface of the first support member and a third surface of the second support member substantially orthogonal to the first surface, and the second support member has a second surface that is an inclined surface between an edge of the first surface and an edge of the third surface that is substantially orthogonal to the first surface.

7. The liquid ejection head according to claim 6, wherein the second surface is formed at a position lower than the first surface in a height direction perpendicular to the first surface.

8. The liquid ejection head according to claim 6, further comprising a cover member covering the electrical wiring board and the second and third surfaces of the second support member, wherein the second surface is formed to be lower than an inner surface of the cover member in a height direction perpendicular to the first surface.

9. The liquid ejection head according to claim 8, wherein a distance between the second surface and the inner surface of the cover member is greater than a thickness of the electrical wiring board.

10. The liquid ejection head according to claim 8, wherein an adhesive that bonds the cover member to the second support member has a lower elastic modulus than that of an adhesive that bonds the electrical wiring board to the first surface.

* * * * *